(12) United States Patent
Rogers (10) Patent No.: US 7,752,196 B2
(45) Date of Patent: Jul. 6, 2010

(54) INFORMATION RETRIEVING AND STORING SYSTEM AND METHOD

(76) Inventor: Robert John Rogers, 6 Marie Crescent, Mona Vale, New South Wales (AU) 2103

( * ) Notice: Subject to any disclaimer, the term of this patent is extended or adjusted under 35 U.S.C. 154(b) by 249 days.

(21) Appl. No.: 11/568,607

(22) PCT Filed: May 13, 2005

(86) PCT No.: PCT/AU2005/000695

§ 371 (c)(1),
(2), (4) Date: Nov. 2, 2006

(87) PCT Pub. No.: WO2005/111860

PCT Pub. Date: Nov. 24, 2005

(65) Prior Publication Data

US 2007/0233660 A1      Oct. 4, 2007

(30) Foreign Application Priority Data

May 13, 2004     (AU) .............................. 2004902570

(51) Int. Cl.
*G06F 17/00* (2006.01)
(52) U.S. Cl. .................. 707/716; 707/755; 707/790
(58) Field of Classification Search .................. 707/716
See application file for complete search history.

(56) References Cited

U.S. PATENT DOCUMENTS

| | | | | |
|---|---|---|---|---|
| 5,594,899 A | * | 1/1997 | Knudsen et al. ................. | 707/2 |
| 5,682,539 A | * | 10/1997 | Conrad et al. ................... | 704/9 |
| 5,701,456 A | * | 12/1997 | Jacopi et al. ................... | 707/4 |
| 5,717,914 A | * | 2/1998 | Husick et al. .................. | 707/5 |
| 5,933,822 A | * | 8/1999 | Braden-Harder et al. ........ | 707/5 |
| 6,026,388 A | * | 2/2000 | Liddy et al. ..................... | 707/1 |
| 6,047,291 A | | 4/2000 | Anderson et al. | |
| 6,052,693 A | * | 4/2000 | Smith et al. ............... | 707/104.1 |
| 6,078,925 A | * | 6/2000 | Anderson et al. ....... | 707/103 R |
| 6,463,433 B1 | * | 10/2002 | Baclawski ..................... | 707/5 |
| 6,654,731 B1 | | 11/2003 | Mahesh | |
| 6,732,097 B1 | | 5/2004 | Wakefield et al. | |
| 2002/0010574 A1 | | 1/2002 | Tsourikov et al. | |
| 2002/0040359 A1 | * | 4/2002 | Green et al. ................... | 707/3 |
| 2002/0147711 A1 | * | 10/2002 | Hattori et al. .................. | 707/3 |
| 2003/0084066 A1 | * | 5/2003 | Waterman et al. ........ | 707/104.1 |
| 2003/0158839 A1 | * | 8/2003 | Faybishenko et al. .......... | 707/3 |
| 2004/0167875 A1 | | 8/2004 | Sneiders | |
| 2004/0181749 A1 | * | 9/2004 | Chellapilla et al. .......... | 715/505 |

(Continued)

FOREIGN PATENT DOCUMENTS

GB          2341250 A         3/2000

(Continued)

*Primary Examiner*—Charles Rones
*Assistant Examiner*—Kurt Mueller
(74) *Attorney, Agent, or Firm*—David A. Guerra (57) ABSTRACT

A computer and implemented process for retrieving and storing information to manage information in a computer system. The computer implemented process uses an input and a processing means, with the input arranged to obtain a statement. The processing means is arranged to select a first record based on an element of the statement. Then select a second record that references the first record. Next, examine the second record to identify a third record, and then retrieve the information by using the third record.

15 Claims, 9 Drawing Sheets

U.S. PATENT DOCUMENTS

2005/0055347 A9 * 3/2005 Cho et al. .................. 707/5
2005/0233291 A1 * 10/2005 Berman .................. 434/322
2005/0289168 A1 * 12/2005 Green et al. ............. 707/101
2008/0059187 A1 * 3/2008 Roitblat et al. ........... 704/257

FOREIGN PATENT DOCUMENTS

WO  03/107141 A2  12/2003

* cited by examiner

| Id | Concept | Rel | Negate | P_Id | C_Id | V_Id | Value | Valid |
|---|---|---|---|---|---|---|---|---|
| 1 | Yes | 5 | No | 1 | 1 | 0 | | Yes |
| 2 | Yes | 5 | No | 2 | 1 | 0 | | Yes |
| 3 | Yes | 5 | No | 3 | 1 | 0 | | Yes |
| 4 | Yes | 5 | No | 4 | 2 | 0 | | Yes |
| 5 | No | 0 | No | 0 | 0 | 0 | | Yes |
| 6 | Yes | 5 | No | 6 | 2 | 0 | | Yes |
| 7 | Yes | 5 | No | 7 | 2 | 0 | | Yes |
| 8 | No | 0 | No | 0 | 0 | 0 | | Yes |
| 9 | Yes | 15 | No | 6 | 4 | 0 | | Yes |
| 10 | Yes | 5 | No | 7 | 4 | 0 | | Yes |
| 11 | No | 5 | No | 11 | 6 | 0 | | Yes |
| 12 | No | 15 | No | 11 | 7 | 0 | English | Yes |
| 13 | No | 15 | No | 11 | 4 | 0 | | Yes |
| 14 | No | 5 | No | 14 | 13 | 0 | concept | Yes |
| 15 | No | 5 | No | 15 | 13 | 0 | instance | Yes |
| 16 | No | 5 | No | 16 | 13 | 0 | word | Yes |
| 17 | No | 5 | No | 17 | 13 | 0 | language | Yes |
| 18 | No | 5 | No | 18 | 13 | 0 | name | Yes |
| 19 | No | 5 | No | 19 | 13 | 0 | part of speech | Yes |
| 20 | Yes | 5 | No | 20 | 3 | 0 | | Yes |
| 21 | Yes | 15 | No | 20 | 13 | 19 | | Yes |
| 22 | Yes | 15 | No | 2 | 13 | 14 | | Yes |
| 23 | Yes | 15 | No | 3 | 13 | 15 | | Yes |
| 24 | Yes | 15 | No | 4 | 13 | 16 | | Yes |
| 25 | Yes | 15 | No | 6 | 13 | 17 | | Yes |
| 26 | Yes | 15 | No | 7 | 13 | 18 | | Yes |
| 28 | No | 5 | No | 28 | 13 | 0 | noun | Yes |
| 29 | Yes | 5 | No | 29 | 2 | 0 | | Yes |
| 30 | Yes | 15 | No | 29 | 13 | 28 | | Yes |
| 31 | No | 5 | No | 29 | 20 | 0 | | Yes |
| 32 | No | 15 | No | 11 | 20 | 29 | | Yes |
| 33 | Yes | 15 | No | 2 | 20 | 29 | | Yes |
| 34 | Yes | 15 | No | 3 | 20 | 29 | | Yes |
| 35 | Yes | 15 | No | 15 | 20 | 29 | | Yes |
| 36 | Yes | 15 | No | 6 | 20 | 29 | | Yes |
| 37 | Yes | 15 | No | 7 | 20 | 29 | | Yes |
| 38 | Yes | 15 | No | 20 | 20 | 29 | | Yes |

Figure 3

Knob Map: Jack.Hair/(colour:black,length:short)    or    Jacques.cheveux/(couleur:noir,longueur:court)

R = Relationship    Cid = ConceptId    Vid = ValueId

| A1 | Name: | *JackKO* | |
|---|---|---|---|
| | R | Cid | Vid/Value |
| 1 | I | ~Person | |
| 2 | H | B3 | B1 |
| 3 | H | A3 | A2 |
| 4 | H | A7 | B8 |
| 5 | | | |
| 6 | | | |
| 7 | | | |

| B1 | Name: | Jack (Name) | |
|---|---|---|---|
| | R | Cid | Vid/Value |
| 1 | I | B3 | Jack |
| 2 | | | |
| 3 | | | |
| 4 | | | |
| 5 | | | |
| 6 | | | |
| 7 | | | |

| C1 | Name: | Hair (Word) | |
|---|---|---|---|
| | R | Cid | Vid/Value |
| 1 | I | B2 | hair |
| 2 | | | |
| 3 | | | |
| 4 | | | |
| 5 | | | |
| 6 | | | |
| 7 | | | |

| A2 | Name: | *Jack.hairKO* | |
|---|---|---|---|
| | R | Cid | Vid/Value |
| 1 | I | A3 | |
| 2 | H | C3 | B4 |
| 3 | H | A5 | C5 |
| 4 | | | |
| 5 | | | |
| 6 | | | |
| 7 | | | |

| B2 | Name: | English Word | |
|---|---|---|---|
| | R | Cid | Vid/Value |
| 1 | I | ~Concept | |
| 2 | H | B2 | Word |
| 3 | | | |
| 4 | | | |
| 5 | | | |
| 6 | | | |
| 7 | | | |

| C2 | Name: | Colour (Word) | |
|---|---|---|---|
| | R | Cid | Vid/Value |
| 1 | I | B2 | colour |
| 2 | | | |
| 3 | | | |
| 4 | | | |
| 5 | | | |
| 6 | | | |
| 7 | | | |

| A3 | Name: | *HairKO* | |
|---|---|---|---|
| | R | Cid | Vid/Value |
| 1 | I | ~Concept | |
| 2 | H | B2 | C1 |
| 3 | H | C3 | |
| 4 | H | A5 | |
| 5 | H | A6 | A8 |
| 6 | | | |
| 7 | | | |

| B3 | Name: | English Name | |
|---|---|---|---|
| | R | Cid | Vid/Value |
| 1 | I | ~Concept | |
| 2 | H | B2 | Name |
| 3 | | | |
| 4 | | | |
| 5 | | | |
| 6 | | | |
| 7 | | | |

| C3 | Name: | *ColourKO* | |
|---|---|---|---|
| | R | Cid | Vid/Value |
| 1 | I | ~Concept | |
| 2 | H | B2 | C2 |
| 3 | H | A6 | B6 |
| 4 | | | |
| 5 | | | |
| 6 | | | |
| 7 | | | |

Figure 4a

| A4 | Name: | Length (Word) |
|---|---|---|
| R | Cid | Vid/Value |
| 1 I | B2 | Length |
| 2 | | |
| 3 | | |
| 4 | | |
| 5 | | |
| 6 | | |
| 7 | | |

| B4 | Name: | *BlackKO* |
|---|---|---|
| R | Cid | Vid/Value |
| 1 I | C3 | C4 |
| 2 H | B2 | B7 |
| 3 H | A6 | |
| 4 | | |
| 5 | | |
| 6 | | |
| 7 | | |

| C4 | Name: | Black (Word) |
|---|---|---|
| R | Cid | Vid/Value |
| 1 I | B2 | Black (Word) |
| 2 | | |
| 3 | | |
| 4 | | |
| 5 | | |
| 6 | | |
| 7 | | |

| A5 | Name: | *LengthKO* |
|---|---|---|
| R | Cid | Vid/Value |
| 1 I | B2 | Length |
| 2 H | B2 | A4 |
| 3 H | A6 | C6 |
| 4 | | |
| 5 | | |
| 6 | | |
| 7 | | |

| B5 | Name: | Short (Word) |
|---|---|---|
| R | Cid | Vid/Value |
| 1 I | B2 | Short |
| 2 | | |
| 3 | | |
| 4 | | |
| 5 | | |
| 6 | | |
| 7 | | |

| C5 | Name: | *ShortKO* |
|---|---|---|
| R | Cid | Vid/Value |
| 1 I | ~Concept | |
| 2 H | B2 | B5 |
| 3 H | A6 | C7 |
| 4 | | |
| 5 | | |
| 6 | | |
| 7 | | |

| A6 | Name: | French Word |
|---|---|---|
| R | Cid | Vid/Value |
| 1 I | ~Concept | |
| 2 H | A6 | |
| 3 | | |
| 4 | | |
| 5 | | |
| 6 | | |
| 7 | | |

| B6 | Name: | Couleur |
|---|---|---|
| R | Cid | Vid/Value |
| 1 I | A6 | couleur |
| 2 | | |
| 3 | | |
| 4 | | |
| 5 | | |
| 6 | | |
| 7 | | |

| C6 | Name: | longueur |
|---|---|---|
| R | Cid | Vid/Value |
| 1 I | A6 | longueur |
| 2 | | |
| 3 | | |
| 4 | | |
| 5 | | |
| 6 | | |
| 7 | | |

Figure 4b

| A7 | Name: | French Name |
|---|---|---|
| R | Cid | Vid/Value |
| 1 | ~Concept | |
| 2 | A6 | nom |
| 3 | | |
| 4 | | |
| 5 | | |
| 6 | | |
| 7 | | |

| B5 | Name: | noir |
|---|---|---|
| R | Cid | Vid/Value |
| 1 | A6 | noir |
| 2 | | |
| 3 | | |
| 4 | | |
| 5 | | |
| 6 | | |
| 7 | | |

| C7 | Name: | court |
|---|---|---|
| R | Cid | Vid/Value |
| 1 | A6 | court |
| 2 | | |
| 3 | | |
| 4 | | |
| 5 | | |
| 6 | | |
| 7 | | |

| A8 | Name: | cheveux |
|---|---|---|
| R | Cid | Vid/Value |
| 1 | A6 | cheveux |
| 2 | | |
| 3 | | |
| 4 | | |
| 5 | | |
| 6 | | |
| 7 | | |

| B8 | Name: | Jacques |
|---|---|---|
| R | Cid | Vid/Value |
| 1 | A7 | Jacques |
| 2 | | |
| 3 | | |
| 4 | | |
| 5 | | |
| 6 | | |
| 7 | | |

| C8 | Name: | |
|---|---|---|
| R | Cid | Vid/Value |
| 1 | | |
| 2 | | |
| 3 | | |
| 4 | | |
| 5 | | |
| 6 | | |
| 7 | | |

INFORMATION RETRIEVING AND STORING SYSTEM AND METHOD

CROSS-REFERENCE TO RELATED APPLICATIONS

This application is an U.S. national phase application under 35 U.S.C. §371 based upon co-pending International Application No. PCT/AU2005/000695 filed on May 13, 2005. Additionally, this U.S. national phase application claims the benefit of priority of co-pending International Application No. PCT/AU2005/000695 filed on May 13, 200 and Australia Application No. 2004902570 filed on May 13, 2004. The entire disclosures of the prior applications are incorporated herein by reference. The international application was published on Nov. 24, 2005 under Publication No. WO 2005/111860 A1.

FIELD OF THE INVENTION

The present invention relates generally to a system and method for retrieving information, and a system and method for storing information. The present invention has particular—but by no means exclusive—application to managing information stored in a computer system.

BACKGROUND OF THE INVENTION

Today's information management systems have been designed to manage information (for example, retrieval or storage of information) based on a predefined information structure. The predefined information structure comprises a number of distinct fields, which are used to represent a particular type of information. For example, one of the fields may be used to store a person's telephone number whilst another of the fields may be used to store the person's address. A problem associated with using a predefined information structure is that unless a field has been allocated for representing a particular type of information, it can be difficult to readily store the particular type of information in the predefined information structure. For example, existing systems designed to manage personal contact information (eg telephone number and address) generally do not have the ability to store the medical details of a person. This is primarily due to the fact that the predefined information structure used in systems designed to manage personal contact do not have fields allocated for storing medical records.

There are two possible options for addressing the above problem associated with employing a predefined information structure. A first option is to have the information management system modified such that the predefined data structure comprises the necessary field. A second option is to replace the existing information management system with a new system that is capable of managing the required information. Unfortunately, these two options are generally undesirable because they can involve significant cost and can result in system downtime.

SUMMARY OF THE INVENTION

According to a first aspect of the present invention there is provided a system for retrieving information, the system comprising:

an input means arranged to obtain a statement; and a processing means arranged to: select a first record based on an element of the statement; select a second record that references the first record; examine the second record to identify a third record; and retrieve the information by using the third record.

Preferably, the processing means is arranged to select the first record by: locating a fourth record that comprises information corresponding to the element; obtaining an identifier of the fourth record; and determining whether the first record comprises the identifier, wherein the first record is selected if it is determined that it comprises the identifier.

Preferably, the processing means is arranged to retrieve the information by: examining the third record to identify at least one fifth record; and obtaining the information from the at least one fifth record.

Preferably, the input means comprises:

an interface arranged to receive a natural language statement; and a parser arranged to create an intermediate language statement based on a parsing of the natural language statement, wherein the processing means is arranged to use the intermediate language statement as the statement.

Preferably, the third record is associated with the first record.

Preferably, the first, second, third, fourth and fifth record are contained in a single table.

According to a second aspect of the present invention there is provided a system for storing information, the system comprising:

an input means arranged to obtain a statement; and a processing means arranged to: create a first record that can be identified based on an element of the statement; create a second record that references the first record and which can be examined to identify a third record; and arranging the third record such that it can be used to retrieve the information.

Preferably, the processing means is arranged to create the first record by: creating a fourth record that comprises information corresponding to the element; obtaining an identifier of the fourth record; and setting the first record such that it comprises the identifier.

Preferably, the processing means is arranged to arrange the third record such that it can be examined to identify at least one fifth record, the processing means arranged to create the fifth record such that it comprises the information.

Preferably, the input means comprises:

an interface arranged to receive a natural language statement; and a parser arranged to create an intermediate language statement based on a parsing of the natural language statement, wherein the processing means is arranged to use the intermediate language statement as the statement.

Preferably, the third record is associated with the first record.

Preferably, the first, second, third, fourth and fifth record are contained in a single table.

According to a third aspect of the present invention there is provided a method of retrieving information, the method comprising the steps of:

obtaining a statement;

selecting a first record based on an element of the statement;

selecting a second record that references the first record;

examining the second record to identify a third record; and retrieving the information by using the third record.

Preferably, the step of selecting the first record comprises the steps of:

locating a fourth record that comprises information corresponding to the element;

obtaining an identifier of the fourth record; and determining whether the first record comprises the identifier, wherein the first record is selected if it is determined that it comprises the identifier.

Preferably, the step of retrieving the information comprises: examining the third record to identify at least one fifth record; and obtaining the information from the at least one fifth record.

Preferably, the step of obtaining the statement comprises:

receiving a natural language statement;

creating an intermediate language statement based on a parsing of the natural language statement; and using the intermediate language statement as the statement.

Preferably, the third record is associated with the first record.

Preferably, the first, second, third, fourth and fifth record are contained in a single table.

According to a fourth aspect of the present invention, there is provided a method of storing information, the method comprising the steps of:

obtaining a statement;

creating a first record that can be identified based on an element of the statement;

creating a second record that references the first record and which can be examined to identify a third record; and arranging the third record such that it can be used to retrieve the information.

Preferably, the step of creating the first record comprises:

creating a fourth record that comprises information corresponding to the element;

obtaining an identifier of the fourth record; and setting the first record such that it comprises the identifier.

Preferably, the step of arranging the third record comprises the steps of:

arranging the third record such that it identifies at least one fifth record; and arranging the fifth record such that it comprises the information.

Preferably, the step of obtaining the statement comprises:

receiving a natural language statement;

creating an intermediate language statement based on a parsing of the natural language statement; and using the intermediate language statement as the statement.

Preferably, the third record is associated with the first record.

Preferably, the first, second, third, fourth and fifth record are contained in a single table.

According to a fifth aspect of the present invention there is provided a computer program comprising at least one instruction for causing a computing device to carry out the method according to the third or fourth aspect of the present invention.

According to a sixth aspect of the present invention there is provided a computer readable medium comprising the computer program according to the fifth aspect of the present invention.

BRIEF DESCRIPTION OF THE DRAWINGS

Notwithstanding any other embodiments that may fall within the scope of the present invention, an embodiment of the present invention will now be described, by way of example only, with reference to the accompanying figures, in which.

AN EMBODIMENT OF THE INVENTION

Figure 1:
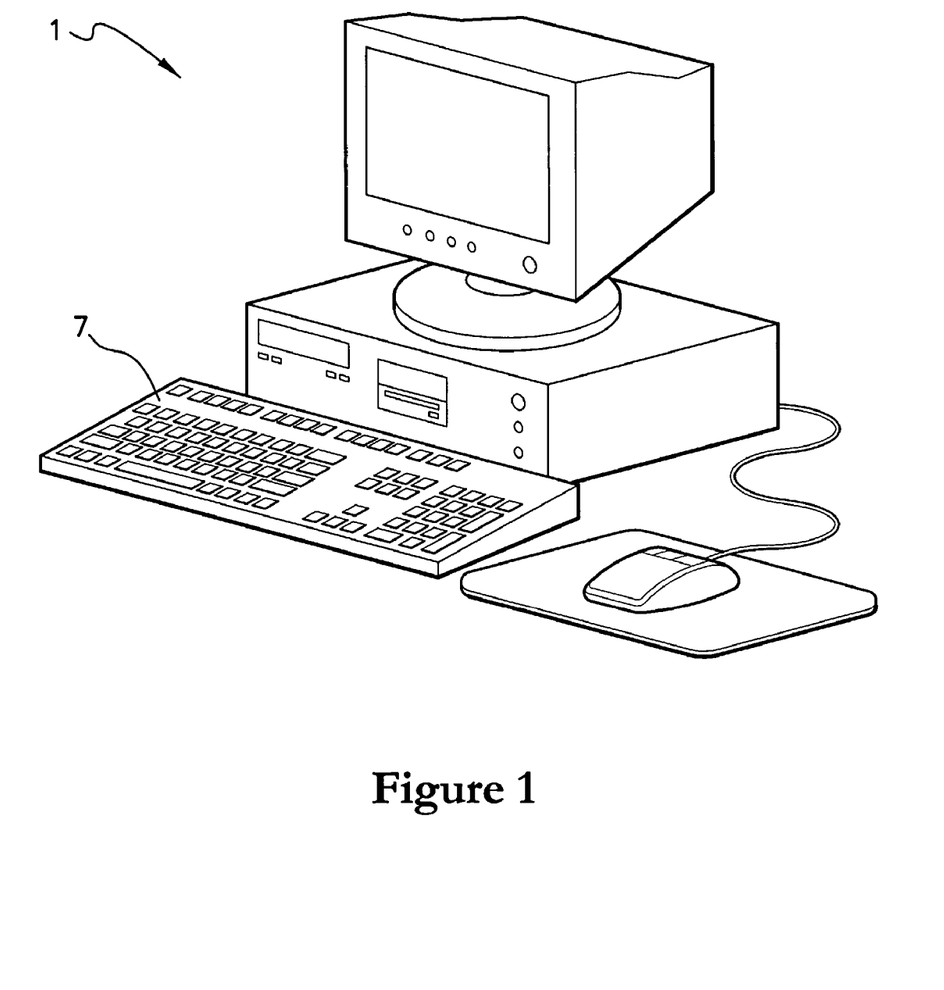
FIG. 1 illustrates an embodiment of the present invention.

FIG. 1 illustrates an embodiment of the present invention. The embodiment comprises a personal computer 1 that is installed with the MICROSOFT WINDOWS™ operating system. In addition to the operating system, the personal computer 1 is installed with information management software that can be used by a user of the computer 1 to manage information. The information management software is such that it can be used to manage a diverse range of information such as contact details for a group of people or a set of medical records.

Figure 2:
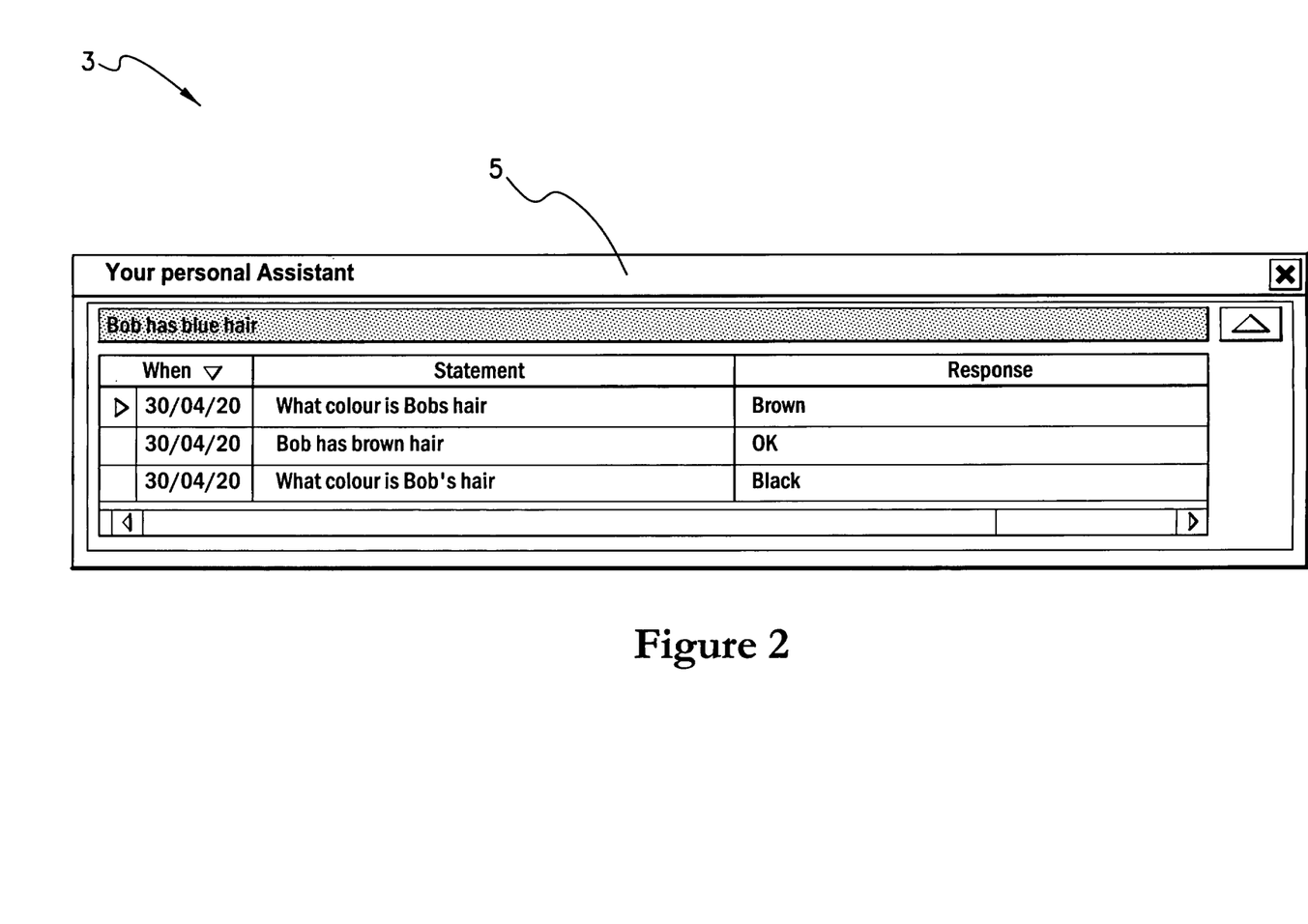
FIG. 2 illustrates a graphical user interface used in the embodiment of the present invention illustrated in FIG. 1.

The information management software comprises a first module that is operable to present an interface 3 in the form of a graphical user interface (GUI), which is illustrated in FIG. 2. The interface 3 comprises a dialog box 5, which a user can type in a natural language statement using a keyboard 7 that is connected to the computer 1. The information management software is such that it has the capability to receive natural language statements in a variety of languages. An example of a natural language statement might be "my car registration is due on 15 Apr. 2005" or "when is my car renewal due?". One of the unique aspects of the embodiment of the present invention is that a user can manage information using natural language statements, which provides the advantage of being easy to use and avoids the undesirable requirement of having to learn a special computer language to manage information.

The information management software comprises a second module that is operable to function as a parser for parsing natural language statements received by the interface 3. The parser is basically operable to create an intermediate language statement from a parsing of a natural language statement. In order to create the intermediate language statement the parser is capable of parsing a natural language statement into subject and predicate, identifying the nouns and qualifying adjectives in the subject and object as well as the verb and the type of relationship it implies.

In addition to being able to parse natural language statements, the second module has the ability to recognise patterns in natural language statements and use the patterns to deduce the type of data so that the input (natural language statement) can be accurately transformed into an intermediate language statement. The information management software is such that pattern definitions are stored in a Knowledge Base (which is described in more detail in the following paragraphs of the specification). Pattern definitions on the Knowledge Base can be added or old patterns definitions edited or deleted. The second module is operable to handle the following control patterns:

Optional—The following pattern is optional. Do not fail the pattern match if it does not appear in the target (input being matched).

Multiple—the following pattern may occur multiple times in the target. Continue to match each repetition until a non-match is found. Unless the optional pattern precedes the multiple patterns, there must be at least one occurrence of a multiple pattern in the target.

The pattern matching ability of the second module is also such that it can handle patterns embedded in patterns—a parent pattern can have a child pattern. For example, if a pattern for a statement is defined as "Subject Predicate", the second module is such that it looks for further pattern Knowledge Items in the "Subject" and "Predicate" Knowledge Items until it locates Knowledge Objects that have no further pattern Knowledge Items. The concept of a Knowledge Item and Knowledge Object is described in detail in the following paragraphs of the specification.

The pattern matching ability of the second module is also such that it can handle multiple child patterns for a parent pattern. For example, if that natural language statement is considered to be a "Sentence", a Sentence pattern may have the following child patterns:

Command
Statement
Question

The intermediate language comprises a set of operators (the actual symbols used as operators are only significant in terms of the interpreter software that needs to decode these statements). Some of the symbols used in the embodiment are as follows:

| | |
|---|---|
| = | Is |
| & | Has a non-exclusive property (Create a new instance if it doesn't exist). Do not invalidate any other instances of this property. |
| . | Has an exclusive property (Create a new instance if it doesn't exist). Invalidate any other instances of this property |
| > | Action |
| ( ) | Used to enclose attributes |
| : | Separates concept and value in an attribute |
| , | Separates attributes. |
| / | Divides the subject from the object in a path. |
| ! | Not |
| * | New Instance or Concept. Create a new Knowledge Item if an exact match does not exist. |
| ? | When placed on the end of a Path, indicates an enquiry not a statement |
| ~n | Used in the Value field of the Knowledge Base. Precede each Knowledge Object Id when one or more Knowledge Object Ids are encoded in an ASCII data stream. 'n' is used to indicate the number of digits in the Knowledge Object Id. This is by way of example only. Some other options for encoding Knowledge Object Ids in a text or other data stream could use a fixed length field ASCII field or a fixed length binary data field, identified by a defined preceding escape character. |

The actual words used in the intermediate language statements can be from any human language, or can also be symbolic information such as pattern masks or mathematical formulae. An example of an intermediate language statement is: Jack.hair/(colour:black, length:short), which would work just as well in French: Jacques.cheveux/(couleur:noir, longueur:court). This example of an intermediate language statement would be interpreted from an English sentence along the lines of "Jack has short black hair".

In addition to the first module and the second module, the information management software comprises a third module that is responsible for managing information; that is for example, storing and retrieving information. In order to manage information, the third module basically uses intermediate language statements created by the second module to manage the information. Before describing how the third module uses an intermediate language statement, it is prudent to describe the manner in which information is stored.

Figure 3:
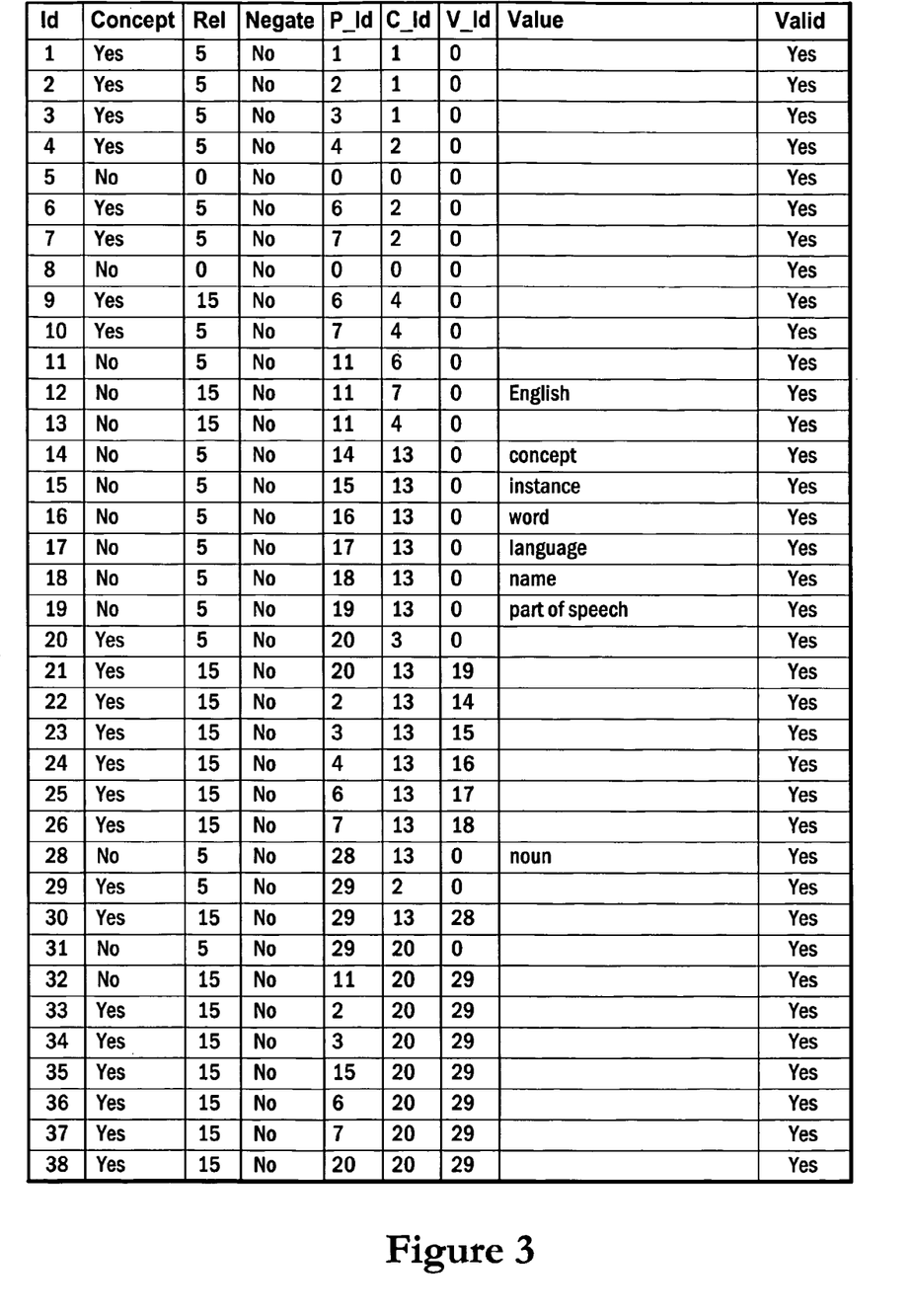
FIG. 3 illustrates a table maintained by the embodiment of the present invention shown in FIG. 1.

In the present embodiment the computer 1 is loaded with MICROSOFT ACCESS™ relational database as the underlying facility for storing information. It will be appreciated by those skilled in the art that the computer 1 can by arranged to use alternative databases as the underlying facility for storing information. The third module is such that it uses a table, herein after referred to the Knowledge Base, which is shown in FIG. 3. The Knowledge Base comprises a variable number of records, referred to herein after as Knowledge Items. The Knowledge Items are effectively the rows in the table shown in FIG. 3. A collection of related Knowledge items represent a Knowledge Object. As can be seen from FIG. 3, each of the Knowledge items contains a number of fields. The following provides a description on the information contained in each of the fields:

Id—A unique field to identify each Knowledge Item.

Concept—An optional field to identify whether this field is a concept or an instance of a piece of knowledge. This is optional because the same information can be encoded as a discrete Knowledge Item, but it is faster and more compact to record it in a field of the Knowledge Item.

Relationship—Indicates the relationship between this Knowledge Item and the Knowledge Object that it belongs to. Examples of relationships are "is", "has" and "does". "Does" can be associated with all sorts of actions (verbs). This field also encodes the tense of the relationship—past, present or future.

Negate—Negates the relationship field to create "is not", "has not" and "does not" style relationships.

Parent_Id—Links Knowledge Items together to form a Knowledge Object. All Knowledge Items sharing the same Parent_Id are closely related and comprise a single Knowledge Object.

Concept_Id—A pointer to another Knowledge Item in the Knowledge Base. This field is used to indicate the concept Knowledge Object of the current Knowledge Item. (Eg. If a Knowledge Object has previously been defined for "colour" and the current Knowledge Item is part of the Knowledge Object for "Red". The current Knowledge Item will state that "Red is a colour" if the Relationship is "is" and the Concept_Id points to the Knowledge Object for "colour").

Value_Id—A pointer to another Knowledge Item in the Knowledge Base. This field is used to indicate the value Knowledge Object of the current Knowledge Item. (For example assume a Knowledge Object has previously been defined for "red" and another Knowledge Object has previously been defined for "colour". The current Knowledge Item is part of the Knowledge Object for "Jack's hair". The current Knowledge Item will state that "Jack has red hair" if the Relationship is "has" and the Concept_Id points to the Knowledge Object for "colour" and the Value_Id points to the Knowledge Object for "red".

Value—Contains any sort of binary data. It is for encoding information that cannot be pointed to by a single Value_Id field. Examples might be text, a pattern of Encoded Value_Id's and other data, audio or video data.

Valid—A flag (Boolean style field) which can be cleared when information stored in a Knowledge Item is no longer valid, but is stored for historical information purposes.

Figure 4A:
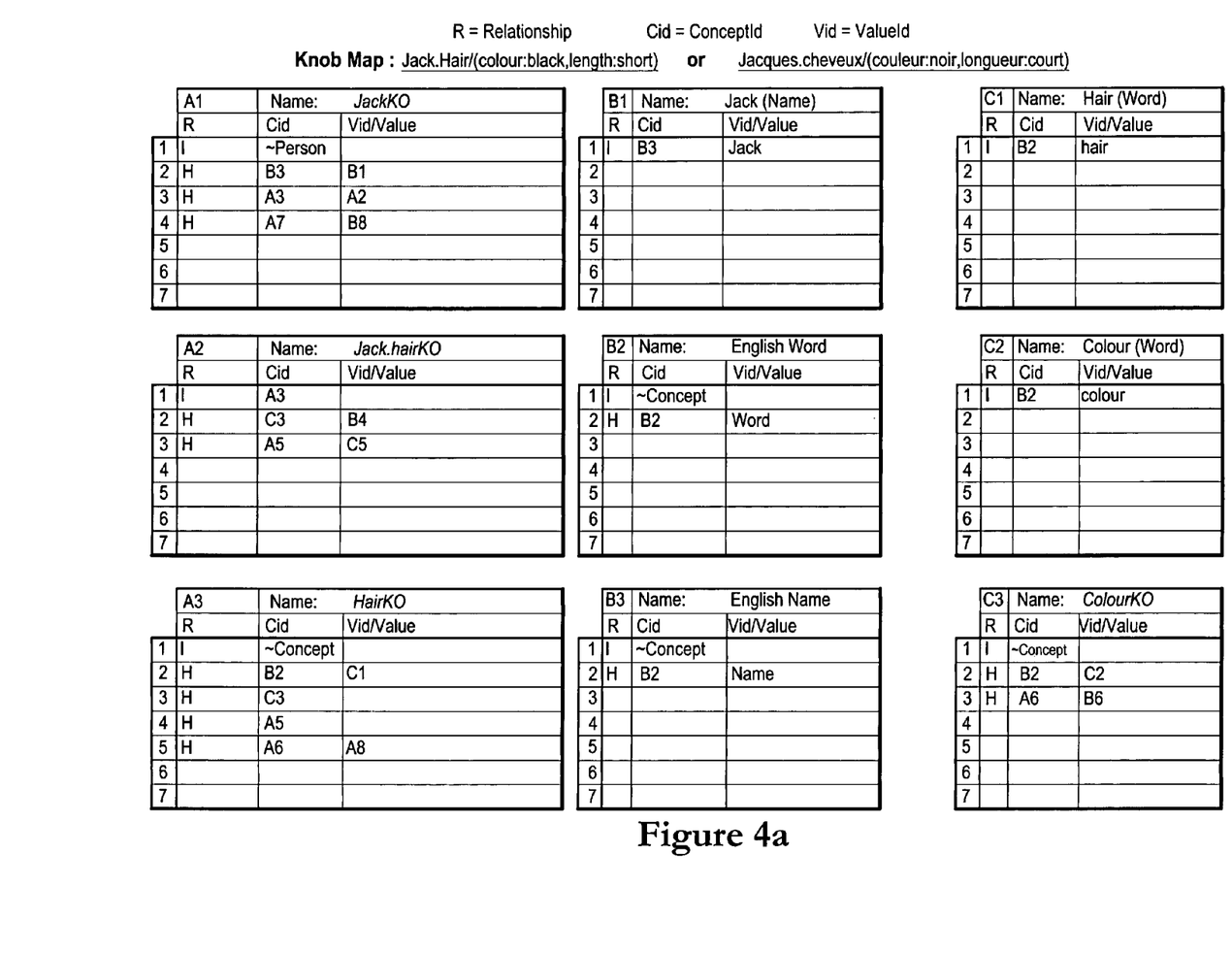
FIGS. 4a to 4c illustrates an example of the way in which information is stored by the embodiment of the present invention shown in FIG. 1.
Figure 4B:
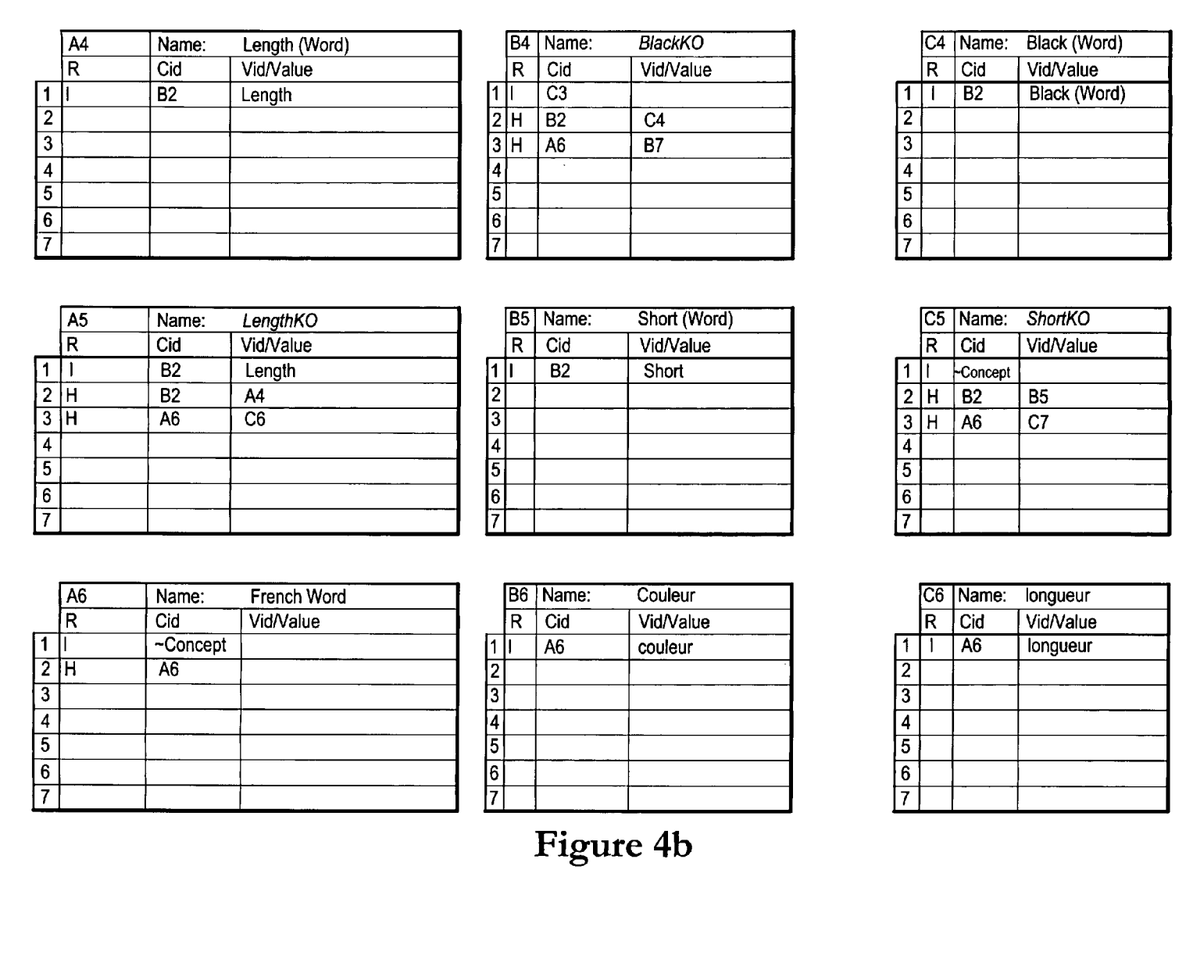
Figure 4C:
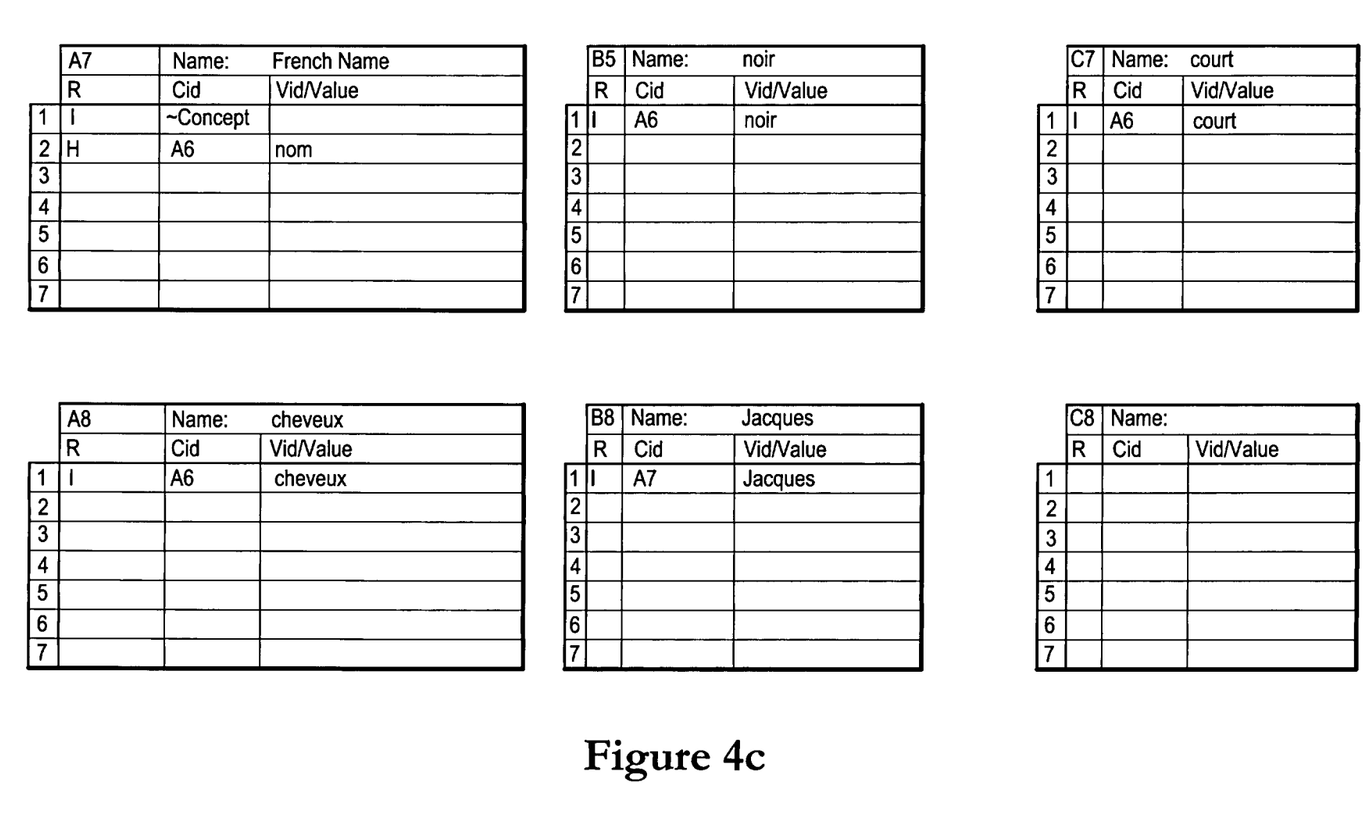

To illustrate how the information management software enables information to be stored, consider the example of a user wanting to store information on the fact that a person called Jack has short black hair. To do this a user could simply type into the dialog box 5 "Jack has short black hair". The second module would convert this natural language statement into the following intermediate language statement: Jack.hair/(colour:black, length:short). With reference to the tables shown in FIG. 4, the intermediate language statement would then be passed to the third module, which attempts to locate all Knowledge Objects that contain a Knowledge Item having the word "Jack" in the Value field, a relationship of "Is" and a CId of B3 (B3 is the Knowledge Object for the concept of an English Name). The Knowledge Object at B1 satisfies these conditions and therefore is the Knowledge Object for the English name Jack. Having located the Knowledge Object for the word "Jack", the next step is to find the Knowledge Object for Jack himself. This is done by locating all Knowledge Objects having a relationship of "Has", CId of B3 (English Name) and a VId of B1. The Knowledge Object at A1 satisfies these conditions and therefore it can be assumed that this Knowledge Object "has an English name of Jack". It is the Knowledge Object for Jack (JackKO) himself. If there is more than one Knowledge Object that suits the criteria, the interpreter will need to prompt for further information before continuing.

After the only (or correctly identified) Jack Knowledge Object (A1) is located in the Knowledge Base, the third module will store this Knowledge Object Id and move to the next word in the intermediate language statement—"hair" and repeat the search process. This will involve locating all Knowledge Objects with Relationship of "Is", a CId of B2 (English Word) and a VId of "hair". C1 is the result. The third module will then proceed to locate Knowledge Objects with relationship of "Has", a CId of B2 (English word) and a VId of C1. A3 is the result. It is the Knowledge Object for the concept of hair (HairKO).

Having identified the first two Knowledge Objects from the intermediate language statement, "Jack.hair" can be substituted with "A1.A3". The next step is to determine if this part of the intermediate language statement can be resolved. The "." Operator implies a "Has" relationship, so the third module must check if Knowledge Object A1 contains a Knowledge Item with a "Has" relationship and a CId of A3. This is found at line 3 of Knowledge Object A1. This Knowledge Item indicates the knowledge that "Jack has Hair". If it did not exist, the Knowledge Base previously had no information that Jack had hair and will therefore create the new Knowledge Item with this data.

To store the extra information regarding Jack's hair (colour and length), a Knowledge Object is required. The VId of the Knowledge Item 3 (A2) points to the Knowledge Object that contains this information. If Knowledge Item 3 did not exist in the previous step, it means that Knowledge Object A2 did not exist either and so the third module would need to create Knowledge Object A2 (Jack.HairKO) and place its Id (A2) in the VId field of Knowledge Item 3. Having resolved the first part of the intermediate language statement "Jacks.hair" to Knowledge Object A3, the third module will move along the intermediate language statement to the word pair "colour:black". Knowledge Objects with Relationship of "Is", a CId of B2 (English Word) and a VId of "colour" are then located. Resulting in the selection of C2.

The third module then locates Knowledge Objects with Relationship of "Has", a CId of B2 (English word) and a VId of C2. C3 is the result. It is the Knowledge Object for the concept of colour (ColourKO). Subsequent to which the third module would try to locate Knowledge Objects with Relationship of "Is", a CId of B2(English Word) and a VId of "black". C4 is the result. Finally, the third module would locate Knowledge Objects with Relationship of "Has", a CId of B2 (English word) and a VId of C4. B4 is the result. It is the Knowledge Object for the concept of black (BlackKO).

Figure 7:
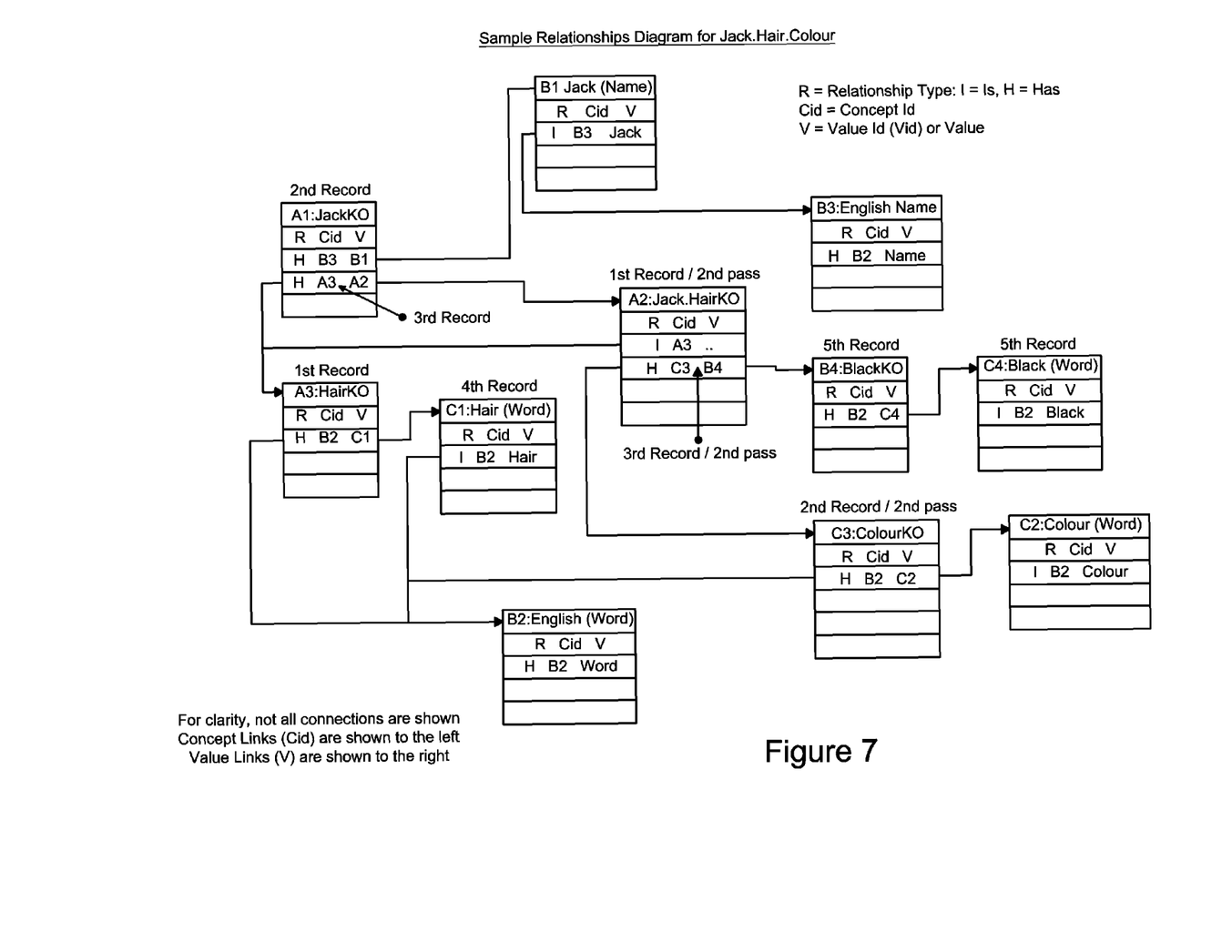
FIG. 7 illustrates the arrangement of information stored by the system of FIG. 1.

Having located these Knowledge Objects, the third module searches A2 (Jack.HairKO) for a Knowledge Object that has a Relationship of 'Has' with a CId of C3 (ColourKO) and a VId of B4 (BlackKO). If this Knowledge Item is found, it indicates that the Knowledge Base already knows that Jack's hair is black and no action is taken. If a Knowledge Item is found which has a Relationship of 'Has' with a Cid of C3 (ColourKO) and a VId which is not equal to B4 (BlackKO), this Knowledge Item is invalidated (IsValid set to false) and a new Knowledge Item is created which has a Relationship of 'Has' with a CId of C3 (ColourKO) and a VId of B4 (BlackKO). This process has changed Jack's hair colour from whatever it was previously to black. If, however, no Knowledge Item is found, a new Knowledge Item is created which has a Relationship of 'Has' with a CId of C3 (ColourKO) and a VId of B4 (BlackKO). This process records Jack's hair colour as black. The arrangement of he information stored by the information management software is shown in FIG. 7.

Having resolved the colour part of the intermediate language statement, the third module will move along the intermediate language statement to the word pair "length:short" and perform steps similar to those outlined above in order to resolve the final part of the statement.

Figure 5:
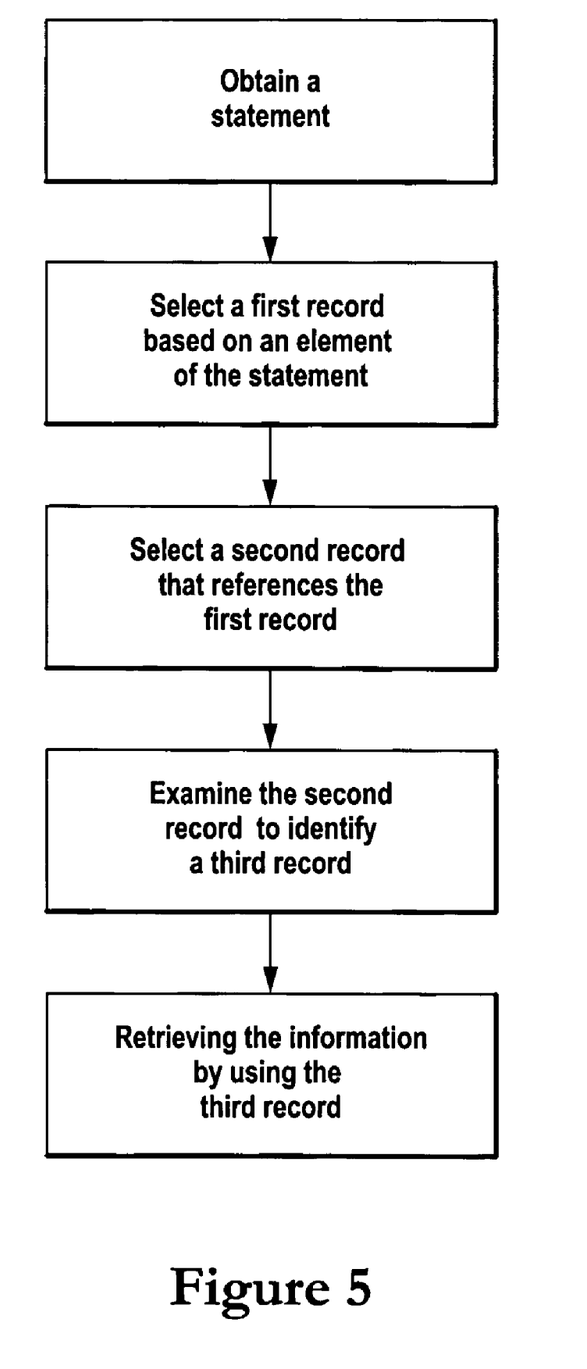
FIG. 5 shows a flow chart of the various steps performed by the system of FIG. 1 when storing information.

The various steps that the information management software performs when storing information are shown in the flow chart of FIG. 5.

To illustrate how the information management software retrieves information, consider the following example. A user wishing to find out what colour hair Jack has could enter the following natural language statement into the dialog box 5: "what colour hair does Jack have?". Passing this statement to the second module would result in the intermediate language statement, "Jack.Hair.Colour?". Using this intermediate language statement the third module would basically follow the previous described steps for identifying Knowledge Objects A1.A3. Once these Knowledge Objects have been identified, the third module proceeds to determine whether hair (A3) has the concept of colour. To do this the third module attempts to locate a Knowledge Object that has a Relationship of "Is", a CId of B2 (English word), and a Vid of colour. The result is C2. At this point the third software module proceeds to locate a Knowledge Object with a Relationship of "Has", CId of B2 (English word) and a VId of C2. This results in C3 being identified.

At this point the third processing means knows that information about Jack is contained in A1, that information about Jack's (A1) hair corresponds to the concept of A3 and that information about the colour of Jacks hair corresponds to the concept of C3. Therefore, in order to retrieve the colour of Jack's hair the third module turns to the Vid field of A1 which corresponds to a Cid of A3, which results in A2. The third module then examines A2, in particular the Vid field of A2 that corresponds to a Cid of C3, which is B4. Because the Vid field of B4 refers to C4 (the English word), the third module obtains the colour of Jacks hair by examining the Value field of C4, which is "Black".

The word Black in the information field is then passed back to the interface 3, which present the word Black in the dialog box 5. Thus, enabling a user to retrieve the information.

Figure 6:
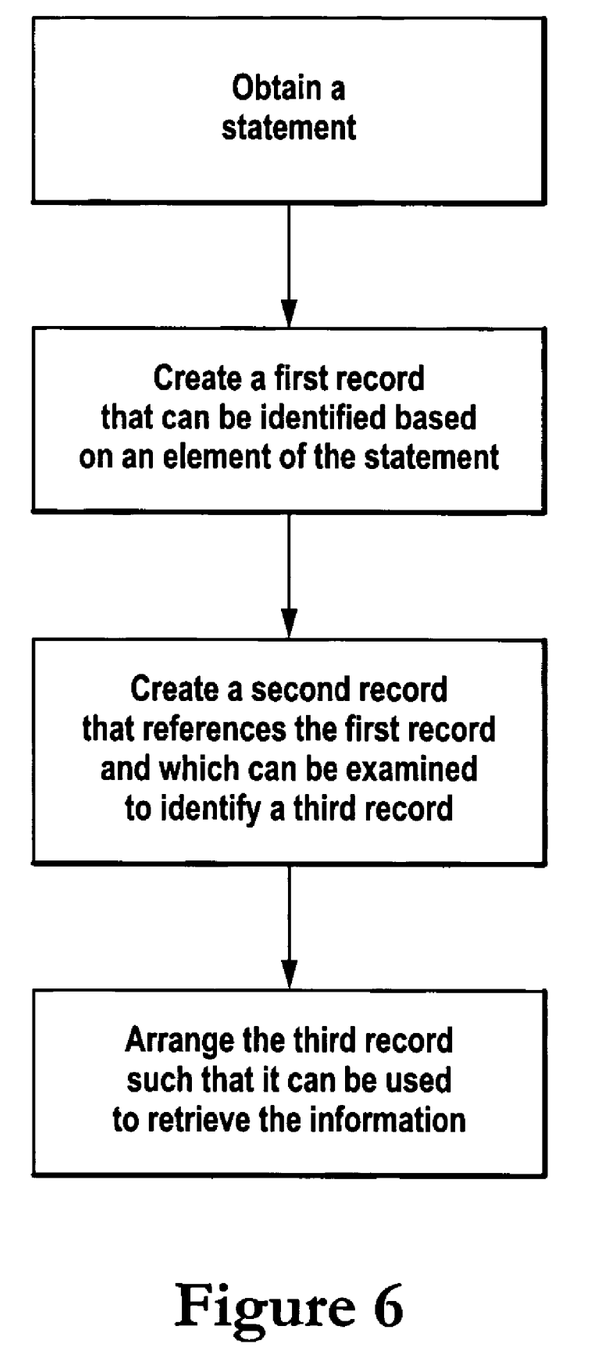
FIG. 6 shows a flow chart of steps performed by the system of FIG. 1 when retrieving information.

The various steps performed by the information management software when retrieving information are shown in the flow chart of FIG. 6.

It will be appreciated by those skilled in the art that the interface 3 may take on different forms in alternative embodiments. For example, in one alternative embodiment the interface could be in the form of a voice interface instead of a text driven interface. Alternatively the interface could be in the form of a software based function (routine) call that contains the statement. Persons skilled in the art will also appreciate that the information stored using the embodiment of the present invention could be a range of different information. For example, the information maybe a line of text used to start up or shut down an application. In this scenario instead of outputting the information to the dialog box 5, the information could be processed to automatically start up the relevant application.

It will be appreciated by those skilled in the art that some of the components of the present invention that alternative embodiments could be implemented using dedicated hardware instead of software.

Throughout this specification the word "record" refers to a single Knowledge Item that may be represented as a single row in a table or to a Knowledge Object that consists of a collection of Knowledge Items that may be represented by rows in a table.

Those skilled in the art will appreciate that the invention described herein is susceptible to variations and modifications other than those specifically described. It should be understood that the invention includes all such variations and modifications which fall within the spirit and scope of the invention.

The invention claimed is:

1. A computer implemented process for retrieving information, said computer implemented process comprising:
    obtaining a statement by an input comprising a user interface coupled to a computer, said user interface being arranged to obtain said statement; and
    providing a processing means using said computer and arranged to: select a first record based on an element of said statement; select a second record that references said first record; examine said second record to identify a third record; and retrieve said information by using said third record;
    wherein said processing means is arranged to select said first record by: locating a fourth record that comprises information corresponding to said element; obtaining an identifier of said fourth record; and determining whether said first record comprises said identifier, wherein said first record is selected when said first record is determined that said first record comprises said identifier;
    wherein said processing means is arranged to retrieve said information by:
        examining said third record to identify at least one fifth record; and
        obtaining said information from said fifth record;
    wherein said third record is associated with said first record;
    wherein said input further comprising: said user interface arranged to receive a natural language statement; and a parser arranged to create an intermediate language statement based on a parsing of said natural language statement, wherein said processing means is arranged to use said intermediate language statement as said statement;
    wherein said first, second, third, fourth and fifth records each contain multiple fields.

2. The computer implemented process as set forth in claim 1, wherein said first, said second, said third, said fourth and said fifth record are contained in a single table.

3. A computer implemented method of retrieving information, said method comprising the steps of:
    obtaining a statement;
    selecting a first record based on an element of said statement;
    selecting a second record that references said first record;
    examining said second record to identify a third record;
    retrieving said information by using said third record;
    locating a fourth record that comprises information corresponding to said element;
    obtaining an identifier of said fourth record;
    determining whether said first record comprises said identifier, wherein said first record is selected when said first record is determined that when said first record comprises said identifier;
    examining said third record to identify at least one fifth record; and
    obtaining said information from said fifth record;
    wherein said third record is associated with said first record;
    wherein said step of obtaining said statement further comprises the steps of:
        receiving a natural language statement;
        creating an intermediate language statement based on a parsing of said natural language statement; and
        using said intermediate language statement as said statement;
    wherein said first, second, third, fourth and fifth records each contain multiple fields.

4. The method as set forth in claim 3, wherein said first, said second, said third, said fourth and said fifth record are contained in a single table.

5. A computer readable storage medium comprising a plurality of instructions, which when executed, causes the computer to perform the steps of:
    obtaining a statement;
    selecting a first record based on an element of said statement;
    selecting a second record that references said first record;
    examining said second record to identify a third record;
    retrieving said information by using said third record;
    locating a fourth record that comprises information corresponding to said element;
    obtaining an identifier of said fourth record;
    determining whether said first record comprises said identifier, wherein said first record is selected when said first record is determined that when said first record comprises said identifier;
    examining said third record to identify at least one fifth record; and
    obtaining said information from said fifth record;
    wherein said step of obtaining said statement further comprises the steps of:
        receiving a natural language statement; creating an intermediate language statement based on a parsing of said natural language statement; and
        using said intermediate language statement as said statement;
    wherein said third record is associated with said first record;
    wherein said first, second, third, fourth and fifth records each contain multiple fields.

6. The computer readable storage medium as set forth in claim 5, wherein said first, said second, said third, said fourth and said fifth record are contained in a single table.

7. The computer implemented process for storing information, said computer implemented process comprising:
   obtaining a statement by an input comprising a user interface coupled to a computer, said user interface being arranged to obtain said statement;
   providing a processing means using said computer and arranged to: create a first record that is identified based on an element of said statement; create a second record that references said first record and which is examined to identify a third record; and arranging said third record such that said third record is used to retrieve said information;
   wherein said processing means is arranged to create said first record by: creating a fourth record that comprises information corresponding to said element; obtaining an identifier of said fourth record; and setting said first record such that said first record comprises said identifier;
   wherein said processing means is arranged to arrange said third record such that said third record is examined to identify at least one fifth record, said processing means operable to create said fifth record such that said fifth record comprises said information;
   wherein said input further comprising: said user interface arranged to receive a natural language statement; and a parser arranged to create an intermediate language statement based on a parsing of said natural language statement, wherein said processing means is arranged to use said intermediate language statement as said statement;
   wherein said third record is associated with said first record;
   wherein said first, second, third, fourth and fifth records each contain multiple fields.

8. The computer implemented process as set forth in claim 7, wherein said first, said second, said third, said fourth and said fifth record are contained in a single table.

9. A computer implemented method of storing information, the method comprising the steps of:
   obtaining a statement;
   creating a first record that is identified based on an element of said statement;
   creating a second record that references said first record and which is examined to identify a third record;
   arranging said third record such that said third record is used to retrieve said information;
   creating a fourth record that comprises information corresponding to said element;
   obtaining an identifier of said fourth record;
   setting said first record such that said first record comprises said identifier;
   arranging said third record such that said third record identifies at least one fifth record; and
   arranging said fifth record such that said fifth record comprises said information;
   wherein said step of obtaining the statement further comprises the steps of:
      receiving a natural language statement; creating an intermediate language
      statement based on a parsing of said natural language statement; and
      using said intermediate language statement as said statement;
   wherein said third record is associated with said first record;
   wherein said first, second, third, fourth and fifth records each contain multiple fields.

10. The computer implemented method as set forth in claim 9, wherein said first, said second, said third, said fourth and said fifth record are contained in a single table.

11. The computer implemented method as set forth in claim 10, wherein said fields being labeled as at least the following comprising:
   an Id field identifying said first, second, third, fourth and fifth record respectively,
   a Relationship field indicating a relationship between said first, second, third, fourth and fifth record containing said field with a collection of said first, second, third, fourth and fifth records;
   a Negate field creating a negative style relationships to negate said Relationship field;
   a Parent Id field linking said first, second, third, fourth and fifth records together;
   a Concept Id field being a pointer that points to at least one of said first, second, third, fourth and fifth records;
   a Value Id field being a pointer that points to at least one of said first, second, third, fourth and fifth records;
   a Value field being binary data; and
   a Valid field being a flag clearable when information stored in said First, second, third, fourth and fifth records respectively is no longer valid, said flag being storable.

12. The computer implemented process as set forth in claim 2, wherein said fields being labeled as at least the following comprising:
   an Id field identifying said first, second, third, fourth and fifth record respectively;
   a Relationship field indicating a relationship between said first, second, third, fourth and fifth record containing said field with a collection of said first, second, third, fourth and fifth records;
   a Negate field creating a negative style relationships to negate said Relationship field;
   a Parent Id field linking said first, second, third, fourth and fifth records together;
   a Concept Id field being a pointer that points to at least one of said first, second, third, fourth and fifth records;
   a Value Id field being a pointer that points to at least one of said first, second, third, fourth and fifth records;
   a Value field being binary data; and
   a Valid field being a flag clearable when information stored in said First, second, third, fourth and fifth records respectively is no longer valid, said flag being storable.

13. The method as set forth in claim 4, wherein said fields being labeled as at least the following comprising:
   an Id field identifying said first, second, third, fourth and fifth record respectively;
   a Relationship field indicating a relationship between said first, second, third, fourth and fifth record containing said field with a collection of said first, second, third, fourth and fifth records;
   a Negate field creating a negative style relationships to negate said Relationship field;
   a Parent Id field linking said first, second, third, fourth and fifth records together;
   a Concept Id field being a pointer that points to at least one of said first, second, third, fourth and fifth records;
   a Value Id field being a pointer that points to at least one of said first, second, third, fourth and fifth records;
   a Value field being binary data; and
   a Valid field being a flag clearable when information stored in said First, second, third, fourth and fifth records respectively is no longer valid, said flag being storable.

14. The computer as set forth in claim 6, wherein said fields being labeled as at least the following comprising:
- an Id field identifying said first, second, third, fourth and fifth record respectively;
- a Relationship field indicating a relationship between said first, second, third, fourth and fifth record containing said field with a collection of said first, second, third, fourth and fifth records;
- a Negate field creating a negative style relationships to negate said Relationship field;
- a Parent Id field linking said first, second, third, fourth and fifth records together;
- a Concept Id field being a pointer that points to at least one of said first, second, third, fourth and fifth records;
- a Value Id field being a pointer that points to at least one of said first, second, third, fourth and fifth records, a Value field being binary data; and
- a Valid field being a flag clearable when information stored in said First, second, third, fourth and fifth records respectively is no longer valid, said flag being storable.

15. The computer implemented process as set forth in claim 8, wherein said fields being labeled as at least the following comprising:
- an Id field identifying said first, second, third, fourth and fifth record respectively;
- a Relationship field indicating a relationship between said first, second, third, fourth and fifth record containing said field with a collection of said first, second, third, fourth and fifth records;
- a Negate field creating a negative style relationships to negate said Relationship field;
- a Parent Id field linking said first, second, third, fourth and fifth records together;
- a Concept Id field being a pointer that points to at least one of said first, second, third, fourth and fifth records;
- a Value Id field being a pointer that points to at least one of said first, second, third, fourth and fifth records;
- a Value field being binary data; and
- a Valid field being a flag clearable when information stored in said First, second, third, fourth and fifth records respectively is no longer valid, said flag being storable.

* * * * *